(12) United States Patent
Gobriel et al.

(10) Patent No.: US 8,488,484 B2
(45) Date of Patent: Jul. 16, 2013

(54) POWER SAVING SYSTEM, METHOD AND APPARATUS FOR A WIRELESS DEVICE

(75) Inventors: Sameh Gobriel, Hillsboro, OR (US); Jr-Shian Tsai, Hillsboro, OR (US); Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 12/888,795

(22) Filed: Sep. 23, 2010

(65) Prior Publication Data
US 2012/0076011 A1    Mar. 29, 2012

(51) Int. Cl.
*H04W 4/00* (2009.01)
*H04W 24/00* (2009.01)
*H04W 52/02* (2009.01)

(52) U.S. Cl.
USPC ............................ 370/252; 370/311; 370/338

(58) Field of Classification Search
None
See application file for complete search history.

(56) References Cited

U.S. PATENT DOCUMENTS

| | | | |
|---|---|---|---|
| 2003/0179717 A1* | 9/2003 | Hobbs et al. | 370/254 |
| 2004/0066751 A1* | 4/2004 | Tseng et al. | 370/252 |
| 2006/0153174 A1* | 7/2006 | Towns-von Stauber et al. | 370/356 |
| 2007/0101020 A1* | 5/2007 | Lin et al. | 709/238 |
| 2008/0259792 A1* | 10/2008 | Cimini et al. | 370/230.1 |
| 2008/0298240 A1* | 12/2008 | Lee et al. | 370/235 |
| 2009/0005054 A1* | 1/2009 | Moritomo et al. | 455/450 |
| 2010/0020697 A1* | 1/2010 | Lewis et al. | 370/241 |

* cited by examiner

*Primary Examiner* — Chi Pham
*Assistant Examiner* — Soon-Dong D Hyun
(74) *Attorney, Agent, or Firm* — Kacvinsky Daisak PLLC

(57) ABSTRACT

A power saving method, system and apparatus may include detecting a traffic mode based on statistics of packet network traffic. A packet-free time may be predicted based on a quality of service metric associated with the traffic mode. A low power state may be entered based on the predicted packet-free time, the quality of service metric and the traffic mode. Other embodiments are described and claimed.

22 Claims, 5 Drawing Sheets

POWER SAVING SYSTEM, METHOD AND APPARATUS FOR A WIRELESS DEVICE

BACKGROUND

Currently, Wireless Wide Area Network (WWAN) interface cards use sleeping modes for power saving. The mobile device must send a sleep request message to a base station and obtain approval through a sleep response message from the base station. The sleep request/response messages contain the power saving class type and the sleeping period. However, due to the exchange of messages, there is a high latency of multiple frames time associated with the entry and exit from the sleep mode. As a result, in order to enter into a sleep or idle mode, the mobile device must have a non-active workload until the device can resume the active mode.

However, it is difficult to optimize power consumption of a Worldwide Interoperability for Microwave Access (WiMAX) device. First, a WiMAX network operator must support a sleep mode operation and different power saving classes. Second, because a message requesting sleep must be sent along with a response to enter a sleep mode, the sleep may only be used between major activities and not between packet bursts because of the latency and overhead associate with sleep entry. Quality of service requirements for latency sensitive (e.g. voice over internet protocol (VoIP)) traffic do not allow the WiMAX device to enter into a sleep or idle mode due to the latency and overhead associated with entering the modes. Also, when a WiMAX device enters a sleep mode, the device does not have information as to when to wake up and how long it should sleep so as to not affect ongoing communication performance. Consequently, there exists a substantial need for efficient techniques for power saving in a WiMAX device.

DETAILED DESCRIPTION

The embodiments are generally directed to techniques designed to reduce power consumption for a wireless device by adaptively power managing device modules based on various network traffic statistics, a traffic mode and predicted packet-free time. Various embodiments provide techniques that include a power saving method, system and apparatus for a communications device, such as a WiMAX device, for example. A traffic mode may be determined based on statistics of packet network traffic. A packet-free time may be predicted based on a quality of service metric associated with the traffic mode. A low power state may be entered based on the predicted packet-free time, the quality of service metric and the traffic mode.

By adaptively-power managing the network interface card (NIC) sub-modules, power savings can occur. A lower power state may be triggered based on traffic characteristics gathered in real time. The quality of service requirements are derived by observing the traffic characteristics and not as input from the applications themselves. This allows the power benefit to be applicable for any kind of application and the WiMAX device is not dependent on network supporting specific features such as, but not limited to, the sleep and/or idle modes.

By adaptively power managing device sub-modules (for example, by powering down, clock gating and/or running at lower frequency), efficiently triggering network based power management and communicating data-free periods to the platform, the power consumption of both the platform and the WiMAX device may be reduced.

In an embodiment, the WiMAX device may use network traffic statistics to determine the type of traffic and predict the duration of the next packet-free period, which is a period when no packets are expected to be received or transmitted. Based on this prediction, the mobile device can power-manage different system components for a short period of time without being noticed by the network and/or trigger an efficient sleep mode pattern that satisfies the ongoing traffic characteristics and quality of service metric.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
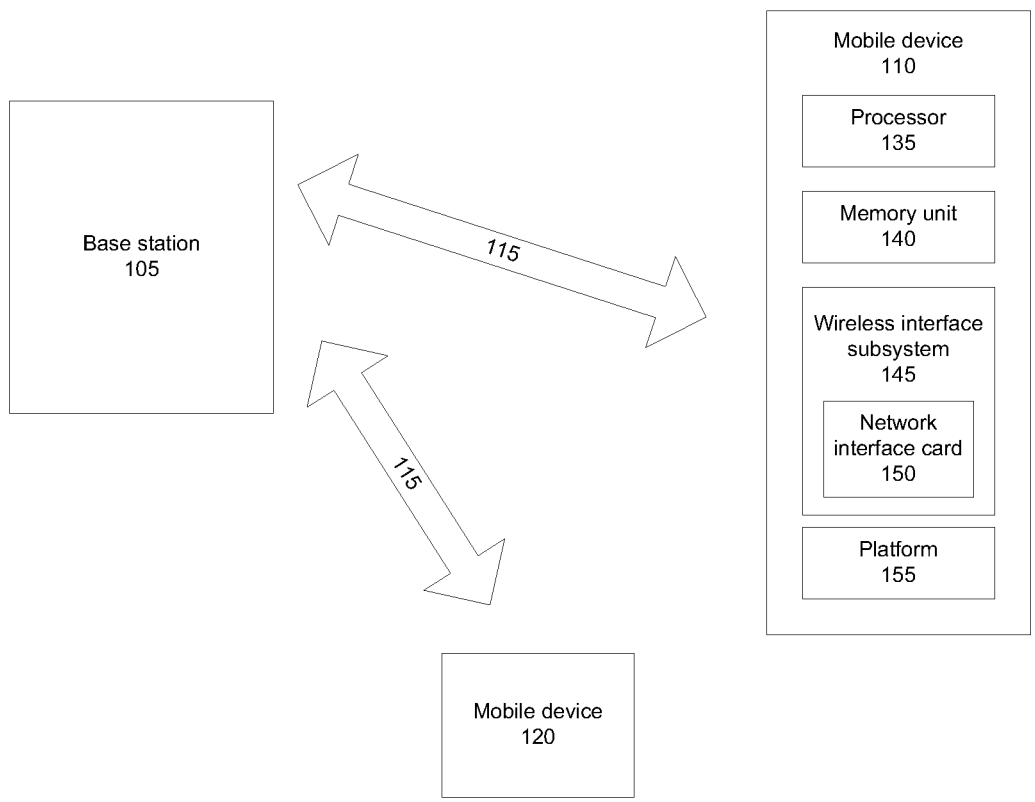
FIG. 1 illustrates one embodiment an exemplary block diagram of a communication system.

FIG. 1 illustrates one embodiment of an exemplary block diagram of a communications system. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wireless communication links, such as wireless shared media 115. Examples of a wireless communication link may include, without limitation, a Wireless Fidelity (WiFi) channel, operating in one or more licensed or license-free frequency bands.

As shown in the illustrated embodiment of FIG. 1, the communications system 100 comprises multiple elements, such as a base station 105 and mobile devices 110, 120. As shown by mobile device 110, the mobile device 110 may include a processor 135, a memory unit 140, a wireless interface subsystem 145, a network interface card 150 and a platform 155. The embodiments, however, are not limited to the elements shown in FIG. 1.

In various embodiments, the communications system 100 may comprise or be implemented as a mobile broadband communications system. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the 802.11z TGz task group, IEEE 802.11z proposed standard, IEEE 802.11z—Extensions to Direct Link Setup (DLS)$_{(August\ 2007\text{-}December\ 2011)}$ In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE) and so forth. The embodiments are not limited in this context.

In various embodiments, the communications system 100 may comprise a base station 105 having wireless capabilities. A base station 105 may comprise a generalized equipment set providing connectivity and/or information to another wireless device, such as one or more mobile devices 110, 120. Examples for the base station 105 may include, but are not limited to, a wireless access point (AP), base station or node B, router, switch, hub and/or gateway. In one embodiment, the base station 105 may include two or more of the above devices located within the same network. For example, a base station 105 may include two access points located in the same provider network. The two access points may have the same service set identifier (SSID). Although some embodiments may be described with the base station 105 implemented as an access point, by way of example, it may be appreciated that other embodiments may be implemented using other wireless devices as well. The embodiments are not limited in this context.

In various embodiments, the communications system 100 may comprise mobile devices 110, 120 having wireless capabilities. The mobile devices 110, 120 may comprise a generalized equipment set providing connectivity to other wireless devices, such as other mobile devices or base stations (e.g., base station 105). Examples for the mobile devices 110, 120 may include without limitation a computer, server, workstation, notebook computer, handheld computer, telephone, cellular telephone, personal digital assistant (PDA), combination cellular telephone and PDA, and so forth. In one embodiment, for example, the mobile devices 110, 120 may be implemented as mobile subscriber stations (MSS) for a WMAN. Although some embodiments may be described with the mobile devices 110, 120 implemented as a MSS by way of example, it may be appreciated that other embodiments may be implemented using other wireless devices as well. The embodiments are not limited in this context.

Each mobile device 110 may include a processor 135, a memory unit 140, a wireless interface subsystem 145 to communicate with a base station 105, a network interface card (NIC) 150 and a platform 155. The processor 135 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 135 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by mobile device 110, the mobile device 110 may comprise a memory unit 140. The memory 140 may comprise any machine-readable or computer-readable media capable of storing data, including both volatile and non-volatile memory. For example, the memory 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 140 may be included on the same integrated circuit as the processor 135, or alternatively some portion or all of the memory 140 may be disposed on an integrated circuit or other medium, for example a hard disk drive, that is external to the integrated circuit of the processor 135. In one embodiment, the memory may include data and instructions to operate the processor. The embodiments are not limited in this context.

In various embodiments, the mobile device 110 may communicate information over wireless shared media 115 via a wireless interface subsystem 145. The mobile device 110 and the base station 105 may each include one or more wireless interface subsystems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

In some embodiments, the wireless interface subsystem 145 may communicate information over the wireless shared media 115 using various multi-carrier techniques utilized by, for example, WiMAX or WiMAX II systems or WLAN systems. For example, the wireless interface subsystems 145 may utilize various Multiple-Input Multiple-Output (MIMO) techniques. The wireless shared media 115 may comprise one or more allocations of RF spectrum. The allocations of RF spectrum may be contiguous or non-contiguous.

The wireless interface subsystem 145 may include, but is not limited to a network interface card (NIC) 150. The NIC 150 is a hardware device that includes an interface to a computer network and allows the device to access that network. The NIC 150 may include memory and a media access control address. In an embodiment, the memory may include memory unit 140. In an embodiment, the memory may include a different memory.

The mobile device 110 may include a platform 155. A platform 155 allows software to run the mobile device using hardware architecture and a software framework.

Figure 2:
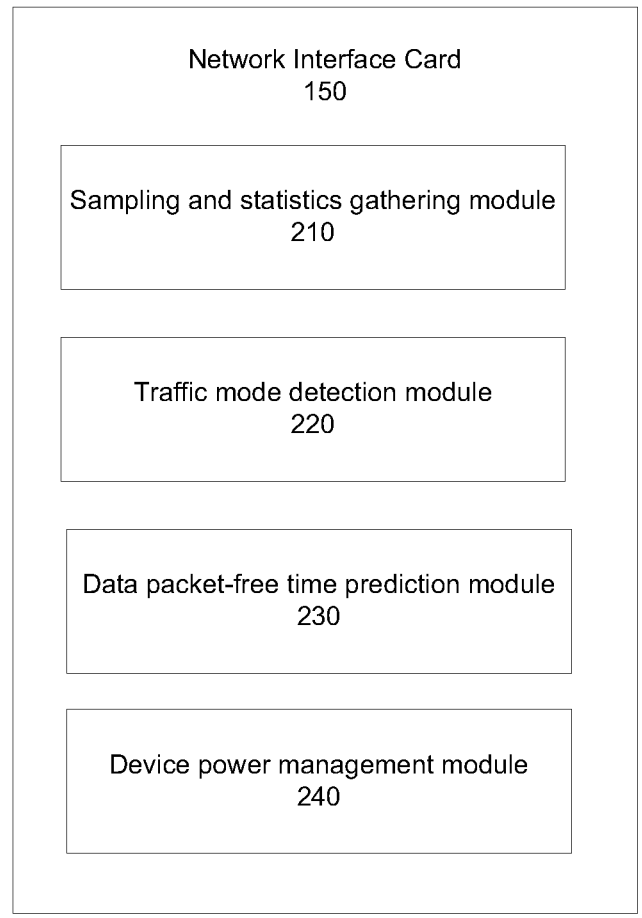
FIG. 2 illustrates one embodiment of an exemplary network interface card.

FIG. 2 illustrates one embodiment of a network interface card. A sampling and statistics gathering module 210 may be implemented by the network interface card. The sampling and statistics gathering module 210 may divide time into slices of windows. During each window slice, a sampling of the network packet traffic may be collected. The sampling and statistics gathering module 210 should gather different information about the network traffic by inspecting the packets header(s). Sampling and statistics module may not typically deep inspect the received packets or packet payload to obtain internal characteristics of the packet. In an embodiment, obtaining the internal characteristics of the packet could cause a high overhead. It may not be efficient to go inside the packet if the packet is encrypted. During the window, the sampling and statistics gathering module 210 may gather statistics on external characteristics regarding the packet. The sampling and statistics gathering module 210 may gather one or more of the following statistics: packet arrival time, packet counts, packet size in bytes, packet direction, such as downlink or uplink, and packet recipient, such as whether the packet is unicast traffic versus multicast traffic. The embodiments are not limited in this context.

At the end of the sampling window, statistics may be determined based on the packet network traffic generated. The statistics may include, but are not limited to, an average and/or standard deviation of the number of packets per burst for the transmission and/or reception path, the average and/or standard deviation of the inter-burst/inter-packet gap for the transmission and/or reception path, the average and/or standard deviation of the packet size for the transmission and/or reception path and the number of uplink and/or downlink packets. For example, based on the average of the number of packets per burst, it may be determined that packets that arrive within 5 msec are considered to belong to the same burst. The statistics obtained by the sampling and statistics gathering module 210 may be sent to the traffic mode detection module 220.

The traffic mode detection module 220 may be able to categorize packet network traffic and determine the quality of service metric associated with the category without having to look inside the packet. The traffic mode detection module 320 may take input from the sampling and statistics gathering module 210, and optionally from an operating system/application (indicating applications running and application quality of service), to categorize the packet network traffic into a specific type, or traffic mode, associated with a quality of service metric. In an embodiment, the traffic mode categories may include, but are not limited to, unknown, voice over internet protocol (VoIP), constant bit rate (CBR), web-traffic, high-throughput FTP, idle and mixed mode. In an embodiment, all the traffic mode categories may run in a best-effort service floor. For example, the VoIP application may be a VoIP session established through a third party voice services platform and not a session with a paid service, such as, RT-VR, set by a mobile device and a base station. In an embodiment, the traffic mode detection module 220 may apply detection rules on the statistics to categorize the current packet traffic sessions running on the system.

In an embodiment, the traffic mode category may be an unknown mode. The unknown traffic mode category may be the default category. The traffic mode detection module 220 may set the traffic mode category to an unknown mode if it cannot detect the traffic type. For example, traffic mode detection module 220 may set the traffic mode category to an unknown mode when the classification conditions for all other traffic modes are not met. The traffic mode detection module 220 may set the traffic mode category to an unknown mode during an initial sampling window and/or when the history of the traffic mode detection module 220 indicates too many changes in the traffic modes. An unknown mode may be sensitive to quality of service metrics, such as latency, for example.

In an embodiment, the traffic mode detection module 220 may set the traffic mode category to a voice over internet protocol (VoIP) mode. Indications that the traffic mode category may be in a VoIP mode may include, but are not limited to, small packets (VoIP packets) arriving at an almost constant bit rate for both the transmit and receive side and one or more of the following conditions are met for both the transmit and receive side: the average burst size is small, the variation in burst size is small, the number of uplink packets is approximately equal to the number of downlink packets, the average size of packet is small and the packets arrive in an almost constant bit rate fashion. For example, the traffic mode category may be set to a VoIP mode when the average burst size is less than two packets, the average variation in burst size is less than one packet, the number of uplink packets is equal to the number of downlink number (plus or minus the jitter), the average size of the packet is less than 300 bytes, the average packet arrival time is less than 80 msec and the variation in inter-packet arrival time is less than 10% of the average.

A VoIP mode may be sensitive to a quality of service metric. A VoIP mode may rely on time synchronization between the traffic source and the destination and may include an end system that may require a predictable response time.

In an embodiment, the traffic mode detection module 220 may set the traffic mode category to a constant bit rate (CBR) mode. The constant bit rate mode may include applications other than VoIP. CBR traffic may have strict quality of service requirements. CBR traffic may include applications, such as, but not limited to, video webcast and audio multicast. A CBR traffic mode may be detected using similar conditions to a VoIP mode except that the burst length may not be a single packet. Indications that the traffic mode category may be a CBR mode may include, but are not limited to, the variation in burst rate is small, the average packet size is small and the packets arrive in an almost constant bit rate fashion. For example, the variation in burst may be less than two packets, the average burst size may be less than 300 bytes, the average inter-burst arrival time is less than 80 msec and the variation in inter-burst arrival time is less than 10% of the average.

A CBR mode may be sensitive to a quality of service metric. A CBR mode may rely on time synchronization between the traffic source and the destination and may include an end system that may require a predictable response time.

In an embodiment, the traffic mode detection module 220 may set the traffic mode category to a high-throughput traffic mode. High-throughput traffic may include applications, such as, but not limited to, file transfer protocol (FTP) and benchmarks application. A high-throughput traffic mode may be detected if the inter-burst arrival time is small. For example, the high-throughput traffic mode may have an inter-burst arrival time of less than 10 msec. However, the variation may be higher than in the CBR traffic mode. For example, the variation in the small inter-burst arrival time may be 20% in a high-throughput traffic mode. In a high-throughput mode, the traffic may be sensitive to quality of service metrics, such as, but not limited to, latency.

In an embodiment, the traffic mode detection module 220 may set the traffic mode category to a web-traffic mode. Web traffic may include applications such as, but not limited to, web-browsing, YouTube and internet file transfer protocol (FTP). A web traffic mode may be detected if the packet network traffic has multiple packet bursts and the average size of the received packets may be larger than small packets. For example, the average burst size may be greater than one and the average size of the packet may be greater than 500 bytes. A web-traffic mode may not be sensitive to the quality of service metrics, such as, but not limited to, jitter, packet loss and latency.

In an embodiment, the traffic mode detection module 220 may set the traffic mode category to a mixed mode. A mixed mode may occur when more than one traffic type or mode is running on a mobile internet device. For example, a user of a mobile phone may be video webcasting and web browsing simultaneously. In an embodiment, a mixed mode may be detected based on the high variability in burst length, packet size and inter-burst arrival time. For example, the variance in burst length may be greater than three packets, the variance in packet size may be greater than 200 bytes and the variance in inter-burst arrival time may be greater than 20 msec.

A mixed mode may be sensitive to a quality of service metric. A mixed mode may inherently rely on time synchronization between the traffic source and the destination and may include an end system that may require a predictable response time.

In an embodiment, the traffic mode detection module 220 may send the traffic mode to a data packet-free time prediction module 230. The data packet-free time prediction module 230 may take input from the sampling and statistics gathering module 210 and the traffic mode detection module 220 to predict the time duration when the device will not receive and transmit any data packet. The data packet-free time prediction module 230 may be continuously updated with each new arriving data packet.

The data packet-free time prediction module 230 may predict the next packet-free time based on the quality of service metric for the traffic mode. A CBR mode, a VoIP mode and a mixed mode may all be sensitive to a quality of service metric and inherently rely on time synchronization between the traffic source and the destination. A CBR mode, a VoIP mode and a mixed mode may all have end systems that require predictable response time. A CBR mode, a VoIP mode and a mixed mode may all have traffic which cannot be delayed in the network. As a result of these factors, when predicting the next data packet-free time for a CBR mode, a VoIP mode and a mixed mode, the initial free time may be set to a conservative value and the idle time prediction with each new packet may be updated linearly. In an embodiment, the initial free time may be set to a conservative value by setting the initial value equal to the average minus the variance of the inter-burst gap of the packets.

Figure 3:
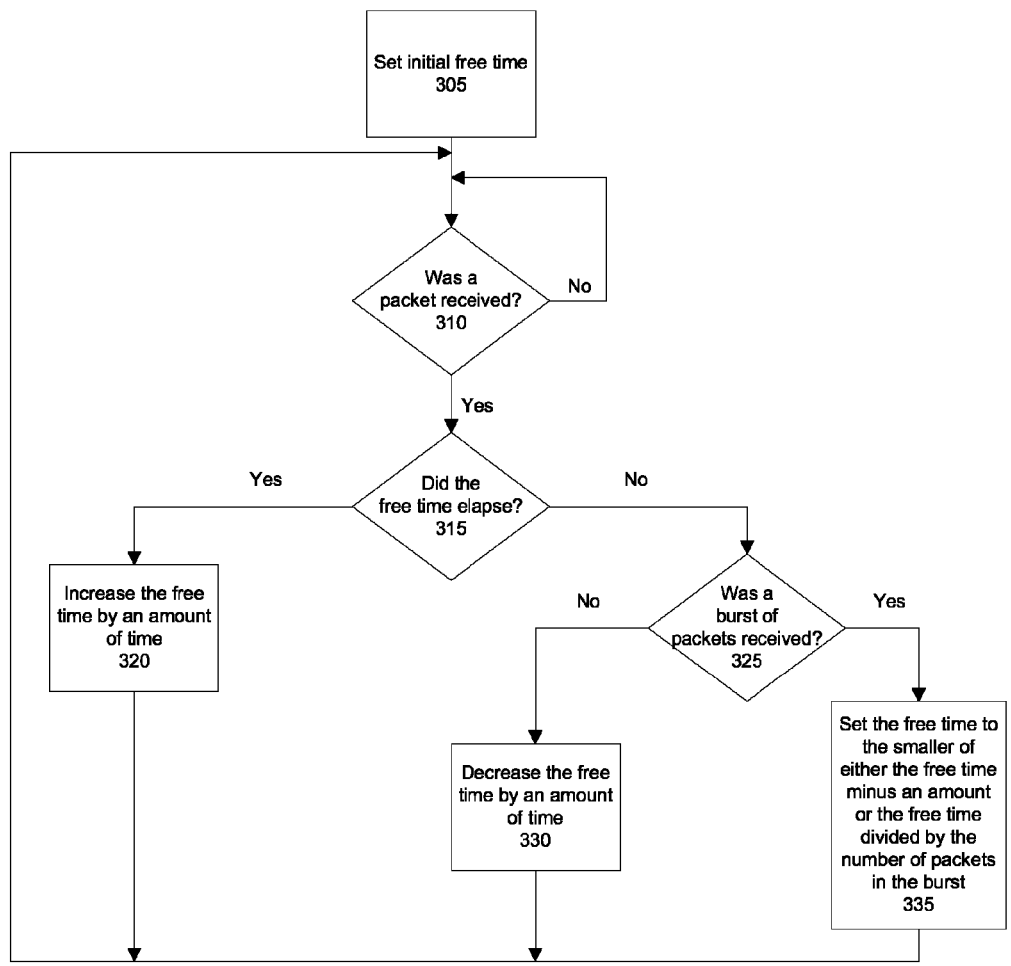
FIG. 3 illustrates one embodiment of a first exemplary logic diagram.

FIG. 3 illustrates one embodiment of a first exemplary logic diagram. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor). Logic flow 300 may describe the features described above with reference to system 100. FIG. 3 discloses a data packet-free prediction flow chart for CBR, VoIP and mixed mode traffic.

In an embodiment, the initial free time may be set to a conservative value because the CBR, VoIP and mixed modes are sensitive to a quality of service metric. In an embodiment, the initial free time may be set 305 to the average minus the variance of the inter-burst gap of the packets. It may be determined 310 whether a packet was received. If no packet was received, then the system may continue to determine whether a packet is received. If a packet was received, it may be determined 315 whether the packet-free time lapsed. If the packet-free time has lapsed, then the prediction for the next packet-free time may be increased 320 by a certain amount of time. The certain amount of time may be a random number, a previously determined number or some other number. In an embodiment, the free time may be increased by a small amount of time. For example, the free time may be increased by 5 msec.

If the free time has not elapsed, it may be determined 325 whether there was a burst of packets. If there was not a burst of packets then the free time may be decreased 330 by some amount of time, such as, but not limited to 5 msec. If there was a burst of packets, then a transmission may have begun. If there was a burst of packets, then the free time may be set 335 to the lower of either the free time minus a certain amount of time, such as, but not limited to 5 msec, or the free time divided by the number packets in the burst. As discussed above, if the detected mode is CBR, VoIP or mixed, then the update of the free time is linear.

For example, the initial free time may be set 305 to 18 if the average may be 20 and the variance may be plus or minus 2. Once a packet is received 310, then it may be determined if more than 18 seconds have passed. If more than 18 seconds have passed, then the free time, 18 msec, may be increased by an amount of time, such as, but not limited to 3 msec. Then the free time will be set to 21 msec (18+3) and it will be determined if another packet has been received.

If less than 18 seconds have passed 315, it may be determined 325 whether a burst of packets was received. If no burst of packets was received, then the free time (18 msec) may be decreased 330 by some amount of time, such as, but not limited to, 3 msec, and the free time will be set to 15 msec (18−3).

If there was a burst of packets 325, then the free time may be set 335 to the lower of either the free time (18 msec) minus a certain amount of time, such as, but not limited to 3 msec, or the free time (18 msec) divided by the number packets in the burst, such as but not limited to, 3 packets. Accordingly, the free time may be set to the smaller of the free time minus a certain amount of time, which may be 15 msec (18−3), or the free time divided by the number of packets in the burst, which may be 6 msec (18/3). Since the free time is set to the smaller of the two amounts, the free time may be set to 6 msec.

Referring back to FIG. 2, for the high-throughput mode and the unknown mode, the traffic may be sensitive to quality of service metrics, such as, but not limited to, latency. When a high-throughput mode is detected or when the traffic type mode is an unknown mode, the network interface card may remain in an active mode until the traffic subsides. As a result, the performance may not be degraded and no packet-free time will be predicted.

For a web-traffic mode, the next packet-free time may be predicted. Web-traffic applications may not be sensitive to the quality of service metrics, such as, but not limited to, jitter, packet loss and latency. The next packet-free time may be aggressively predicted due to the low sensitivity of the quality of service metrics associated with the web-traffic mode. In an embodiment, the initial free time may be set to an aggressive value by setting the initial value equal to average time between bursts.

Figure 4:
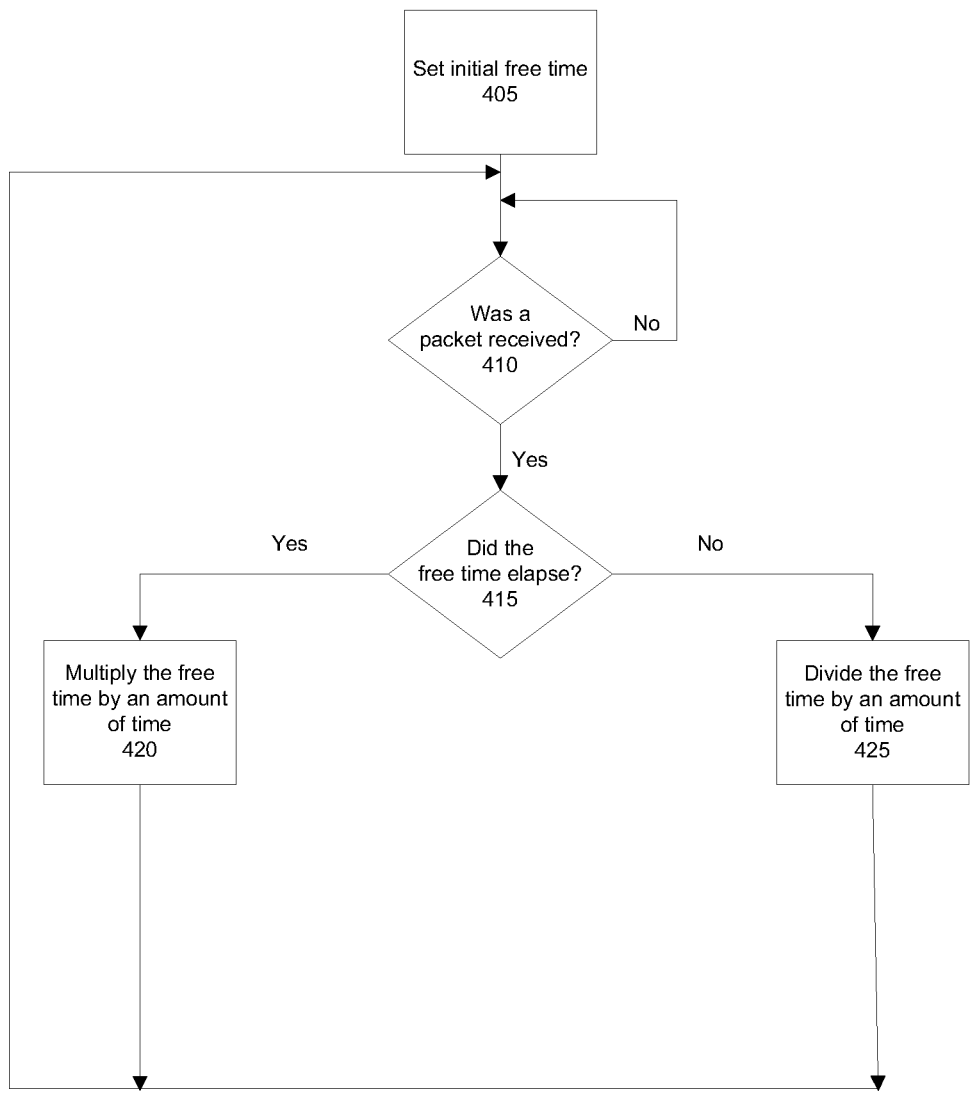
FIG. 4 illustrates one embodiment of a second exemplary logic diagram.

FIG. 4 illustrates one embodiment of an exemplary second logic diagram. The logic flow 400 may be performed by various systems and/or devices and may be implemented as hardware, software, firmware, and/or any combination thereof, as desired for a given set of design parameters or performance constraints. For example, one or more operations of the logic flow 400 may be implemented by executable programming or computer-readable instructions to be executed by a logic device (e.g., computer, processor). Logic flow 400 may describe the features described above with reference to system 100.

In an embodiment, an initial free time may be set 405 to the average inter-burst gap of the packets. It may be determined 410 whether a packet was received. If no packet was received, then the system may continue to determine whether a packet is received 410. If a packet was received, it may be determined 415 whether the free time lapsed. If the free time lapsed, then the free time may be multiplied 420 by a certain amount of time. The free time may be multiplied by an amount such as, but not limited to, 2. If the free time has not elapsed, the free time may be set 425 to the free time divided by an amount of time, such as, but not limited to 2. Accordingly, when the mode is web-traffic mode, the initial prediction for the next packet-free time is set to the average inter-burst gap and the updates to the free time are exponentially increased or decreased.

For example, the initial free time may be set 405 to 20 is the average inter-burst gap was 20. Once a packet was received 410, then it may be determined if more than 20 seconds have passed. If more than 20 seconds have passed, then the free time, 20 msec, may be multiplied by an amount of time, such as, but not limited to 2. Then the free time will be set to 40 msec (20*2) and it will be determined if another packet has been received.

If less than 20 seconds have passed 415, then the free time (20 msec) may be divided 425 by some amount of time, such as, but not limited to, 2, and the free time will be set to 10 msec (20/2).

Referring to FIGS. 3 and 4, it should be understood that in some embodiments that logic flow 300 and logic flow 400 may be implemented or arranged to perform tasks in parallel, including processing a plurality of threads and controlling a plurality of cores at substantially the same time. Moreover, it should also be understood that the logic flow 300 and logic flow 400 are each only one example of a logic flow and that different numbers, orders and/or arrangements of the operations described in logic flow 300 or logic flow 400 could be implemented and still fall within the described embodiments. Other embodiments are described and claimed.

Referring back to FIG. 2, a device power management module 240 may use the network statistics from the sampling and statistics gathering module 210 and the traffic mode determined by the traffic mode detection module 220 to execute a power management function that saves energy without violating quality of service metrics. The power management module 240 may determine whether to enter a low power state based on one or more of the following factors, such as, but not limited to, a power index set by a user which is coupled with the current battery power and a user preference of energy efficiency versus performance, the traffic category detected, the available low power states, the exit latency and break-even time for each low-power state, and history of the previous low power states used.

For example, a mobile device may have multiple possible low power states, such as, but not limited to, low power state 1 which is running at a lower frequency, a low power state 2, which turns off the baseband module, or low power state 3 which turns off the baseband processor and removes one of the receive chains. The exit latency of a low power state may be the time the device takes to return to the full active operational state. The break-even time of each power state may be the time that the device must be in the low power state in order to break even with the amount of energy consumed in entering and exiting this low power state. For example, the low power state 2 may have a break-even time of 500 msec. The device must be in the low power state 2 for more than 500 msec in order to reduce the amount of energy consumed. In an embodiment, the history of the pervious power states may be used by the power management module 240 to determine whether to enter a low power state. For example, a device may have entered into low power state 3 and stayed there for 2 msec the previous time and may have entered the low power state 2 and stayed therefore 20 msec the two times ago.

In an embodiment, the network interface card 150 on the device may have a control module that maintains an exponential moving average of the next expected duration of stay in each given lower power state. This average may be updated with each new packet-free time prediction. The device may try to enter the lowest available power state given that the exponential moving average of the predicted duration of stay is greater than the break-even time of the power state.

In an embodiment, a low power state of the network interface card may be available in which one receive chain can be turned off while leaving other receive chains turned on for reception and control frames. In an embodiment, the power management module 240 may execute a power management function which switches the device to a low power state within the predicted idle period. In an embodiment, the mobile device may not lose any packets, because at least one receive chain such as, but not limited to, a physical chain, a radio frequency and/or the lower media access control are always turned on. In an embodiment, the mobile device will not have a performance impact because the upper media access control and the second receive chain is turned back on before the predicted arrival of the next packet.

In an embodiment, based on the network statistics and the traffic mode detected, the mobile device may dynamically change its sleep pattern each time a new traffic mode is detected. The mobile device may dynamically request a different pattern of available/unavailable slots from a base station. For example, if the detected traffic mode is a VoIP mode, then the WiMAX network interface may request a new sleep pattern from the network by requesting an unavailability slot equal to the burst inter-arrival time. For example, the network interface card may request that for two slots the mobile device is awake and for one slot the mobile device is asleep.

In an embodiment, a next packet-free time may be communicated to the platform. The WiMAX network interface card may provide the host with predictions of the next packet-free time. The prediction may be based on the traffic characteristics that the NIC is experiencing and/or the predictions that for a certain amount of milliseconds, no packets will be sent to the host for processing. In an embodiment, the predictions may allow the platform to enter a platform level low power state without waiting for inactivity timeouts. In an embodiment, the platform may use its own platform power management function to determine packet-free time predictions and determine whether the platform should enter a lower state. However, the information from the network interface card may be used by the platform to determine whether to enter into a low power state.

Figure 5:
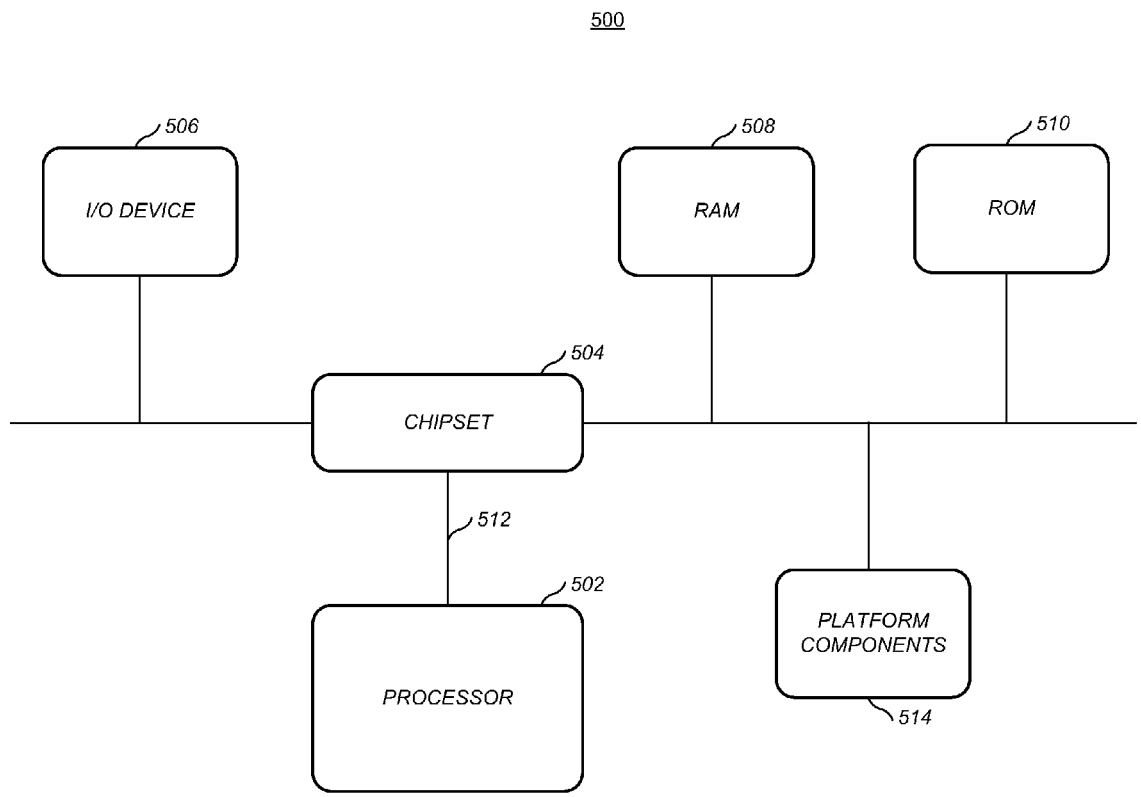
FIG. 5 illustrates one embodiment of a diagram of an exemplary system.

FIG. 5 is a diagram of an exemplary system embodiment. In particular, FIG. 5 is a diagram showing a system 500, which may include various elements. For instance, FIG. 5 shows that system 500 may include a processor 502, a chipset 504, an input/output (I/O) device 506, a random access memory (RAM) (such as dynamic RAM (DRAM)) 508, and a read only memory (ROM) 510, and various platform components 514 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 5, I/O device 506, RAM 508, and ROM 510 are coupled to processor 502 by way of chipset 504. Chipset 504 may be coupled to processor 502 by a bus 512. Accordingly, bus 512 may include multiple lines.

Processor 502 may be a central processing unit comprising one or more processor cores and may include any number of processors having any number of processor cores. The processor 502 may include any type of processing unit, such as, for example, central processing unit (CPU), multi-processing unit, a reduced instruction set computer (RISC), a processor that have a pipeline, a complex instruction set computer (CISC), a digital signal processor (DSP), and so forth.

Although not shown, the system 500 may include various interface circuits, such as an Ethernet interface and/or a Universal Serial Bus (USB) interface, and/or the like. In some exemplary embodiments, the I/O device 506 may comprise one or more input devices connected to interface circuits for entering data and commands into the system 500. For example, the input devices may include a keyboard, mouse, touch screen, track pad, track ball, isopoint, a voice recognition system, and/or the like. Similarly, the I/O device 506 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 500 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first,'" "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An article comprising a non-transitory machine-readable storage medium containing instructions that when executed enable a system to:
   determine statistics on packet network traffic;
   associate a quality of service metric and a traffic mode for a packet based on the statistics;
   predict a packet-free time based on the traffic mode and the quality of service metric; and
   send a control directive to enter a low power state based on the predicted packet-free time, the quality of service metric and the traffic mode.

2. The article of claim 1 wherein said instructions that when executed enable a system to determine statistics comprise instructions that when executed enable a system to collect and sample the packet network traffic over a period of time.

3. The article of claim 1 wherein said instructions that when executed enable a system to:
   set an initial predicted packet-free time based on whether the traffic mode is sensitive to the quality of service metric; and
   update the packet-free time based on each received packet.

4. The article of claim 1 wherein said instructions that when executed enable a system to determine a quality of service metric and a traffic mode for a packet based on the statistics comprise instructions that when executed enable a system to classify the packet network traffic into one or more of an unknown mode, a voice over internet protocol (VoIP) mode, a constant bit rate (CBR) mode, a high-throughput traffic mode or a web-traffic mode or a mixed mode.

5. The article of claim 1 wherein said instructions that when executed enable a system to:
   linearly update the predicted packet-free time with each new packet when the traffic mode is sensitive to the quality of service metric; and
   exponentially update the predicted packet-free time with each new packet when the traffic mode is not sensitive to the quality of service metric.

6. The article of claim 1 wherein said instructions that when executed enable a system to manage power of different sub-modules in-between packet burst to reduce power consumption.

7. The article of claim 1, further comprising instructions that when executed enable a system to send one or more of the statistics, the traffic mode and the predicted packet-free time to a network platform.

8. A communications device comprising:
   a network interface card comprising:
      a sampling and statistics module operative to determine statistics on packet network traffic;
      a traffic mode module operative to detect a traffic mode based on the statistics;
      a packet-free time prediction module operative to predict a packet-free time based on a quality of service metric associated with the traffic mode; and a power management mode operative to generate control directives to enter a low power state based on the predicted packet-free time, the quality of service metric and the traffic mode.

9. The device of claim 8, further comprising:
a platform in communication with a network interface card, wherein the one or more modules of the network interface card communicates with the platform.

10. The device of claim 8 wherein the power management mode of the network interface card adaptively controls power-down of device sub-modules.

11. The device of claim 8 wherein the network interface card dynamically changes a sleep pattern of the communications device each time a new traffic mode is detected.

12. The device of claim 8, further comprising: a digital display.

13. A method comprising:
detecting, by a processor, a traffic mode based on statistics of packet network traffic;
predicting a packet-free time based on a quality of service metric associated with the traffic mode; and
entering a low power state based on the predicted packet-free time, the quality of service metric and the traffic mode.

14. The method of claim 13, further comprising determining statistics via collecting and sampling the packet network traffic over a period of time.

15. The method of claim 13 wherein predicting a packet-free time based on the quality of service metric associated with the traffic mode comprises:
setting an initial predicted packet-free time based on whether the traffic mode is sensitive to the quality of service metric; and
updating the packet-free time based on each received packet.

16. The method of claim 13, further comprising determining statistics based on one or more of the following: packet arrival time, packet counts, packet size in bytes, packet direction and packet recipient.

17. The method of claim 13, further comprising:
determining one or more of an average number of packets per burst for each transmission and/or reception path, a standard deviation of packets per burst for each transmission and/or reception path, an average of a inter-burst/inter-packet gap for each transmission and reception path, a standard deviation of an inter-burst/inter-packet gap for each transmission and/or reception path, an average packet size for each transmission and/or reception path, a standard deviation of a packet size for each transmission and/or reception path, a number of uplink packets, or a number of downlink packets.

18. The method of claim 13 wherein detecting a traffic mode based on statistics of packet network traffic comprises classifying the packet network traffic into one or more of an unknown mode, a voice over internet protocol (VoIP) mode, a constant bit rate (CBR) mode, a high-throughput traffic mode, a web-traffic mode or a mixed mode.

19. The method of claim 13 wherein predicting a packet-free time based on a quality of service metric associated with the traffic mode comprises:
linearly updating the predicted packet-free time with each new packet when the traffic mode is sensitive to the quality of service metric; and
exponentially updating the predicted packet-free time with each new packet when the traffic mode is not sensitive to the quality of service metric.

20. The method of claim 13 wherein entering a low power state based on the predicted packet-free time, the quality of service metric and the traffic mode comprises determining one or more of: a user preference, available power states, exit latency, break even time for each power state and a history of previous low power states.

21. The method of claim 13 wherein entering a low power state based on the predicted packet-free time, the quality of service metric and the traffic mode comprises saving power by power-managing different sub-modules in-between packet bursts.

22. The method of claim 13, further comprising:
sending one or more of the statistics, the traffic mode and the predicted packet-free time to a network platform.

* * * * *